United States Patent
Kitamura et al.

(10) Patent No.: US 11,015,554 B2
(45) Date of Patent: May 25, 2021

(54) STRADDLED VEHICLE (71) Applicant: YAMAHA HATSUDOKI KABUSHIKI KAISHA, Iwata (JP)

(72) Inventors: Eigo Kitamura, Iwata (JP); Naoya Shiraishi, Iwata (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 0 days.

(21) Appl. No.: 16/912,873

(22) Filed: Jun. 26, 2020

(65) Prior Publication Data

US 2020/0408179 A1 Dec. 31, 2020

(30) Foreign Application Priority Data

Jun. 28, 2019 (JP) .............................. JP2019-122003

(51) Int. Cl.
- *F02M 35/16* (2006.01)
- *F02M 35/14* (2006.01)
- *F02M 35/02* (2006.01)
- *F02M 35/024* (2006.01)
- *F02M 35/12* (2006.01)

(52) U.S. Cl.
CPC .......... *F02M 35/162* (2013.01); *F02M 35/14* (2013.01); *B60Y 2200/12* (2013.01); *F02M 35/0204* (2013.01); *F02M 35/024* (2013.01); *F02M 35/1255* (2013.01)

(58) Field of Classification Search
CPC .... F02M 35/162; F02M 35/14; F02M 35/024; F02M 35/0204; F02M 35/1255; B60Y 2200/12
See application file for complete search history.

(56) References Cited

U.S. PATENT DOCUMENTS

| | | | |
|---|---|---|---|
| 2009/0008181 A1* | 1/2009 | Pedersen | F02M 35/10295 180/229 |
| 2014/0041615 A1* | 2/2014 | Koyama | F02M 35/024 123/184.57 |
| 2015/0061275 A1* | 3/2015 | Deckard | B62D 29/00 280/788 |
| 2017/0167453 A1* | 6/2017 | Koyama | B60K 13/02 |

FOREIGN PATENT DOCUMENTS

| | | | |
|---|---|---|---|
| CN | 201187378 Y | * | 1/2009 |
| EP | 0233809 A1 | | 8/1987 |
| EP | 1029723 A2 | | 8/2000 |
| EP | 1614889 A1 | | 1/2006 |
| JP | 04306183 A | * | 10/1992 |
| JP | H04306185 A | | 10/1992 |
| JP | 2015-063257 A | | 4/2015 |

* cited by examiner

*Primary Examiner* — Jacob M Amick
*Assistant Examiner* — Charles J Brauch
(74) *Attorney, Agent, or Firm* — Rabin & Berdo, P.C.

(57) ABSTRACT

A straddled vehicle includes an air cleaner and a resonator. The air cleaner includes an air cleaner case, an air-cleaning element arranged inside the air cleaner case, and a duct that is attached to the air-cleaning element. At least a portion of the duct is arranged inside the air cleaner case, and the duct guides the air toward the air-cleaning element. The resonator has an outer wall arranged around the duct. The duct and the outer wall together define at least a portion of a resonance chamber of the resonator.

13 Claims, 6 Drawing Sheets

STRADDLED VEHICLE

CROSS-REFERENCE TO RELATED APPLICATIONS

This application claims the benefit of priority to Japanese Patent Application No. 2019-122003 filed on Jun. 28, 2019. The entire contents of this application are hereby incorporated herein by reference.

TECHNICAL FIELD

The present invention relates to a straddled vehicle having a resonator provided in an air cleaner.

BACKGROUND ART

Conventional straddled vehicles having an air cleaner and a resonator provided in the air cleaner are known in the art. For example, Japanese Laid-Open Patent Publication No. 2015-63257 describes a motorcycle including an air cleaner case having a main chamber and left and right sub chambers, a first resonator arranged inside the main chamber, and a second resonator arranged inside the sub chambers. An opening for taking in the air is formed on the side of the air cleaner case, and an air-cleaning element is attached so as to cover the opening. The air that has been cleaned through the air-cleaning element flows into the main chamber and the sub chambers.

SUMMARY OF INVENTION

Technical Problem

The air cleaner is for cleaning the air by means of the air-cleaning element to supply a clean air to the internal combustion engine. If the volume of the air cleaner case on the downstream side relative to the air-cleaning element is small, it is not possible to quickly supply a sufficient amount of clean air to the internal combustion engine, thereby lowering the performance of the internal combustion engine.

With the straddled vehicle disclosed in Japanese Laid-Open Patent Publication No. 2015-63257, a first resonator is arranged inside the main chamber, and a second resonator is arranged inside the sub chambers. The volume of the main chamber and the volume of the sub chambers are reduced by the volumes of these resonators. That is, the volume of the air cleaner case on the downstream side relative to the air-cleaning element is reduced by the volumes of the resonators. Therefore, the performance of the internal combustion engine may lower. One may consider increasing the size of the air cleaner case by the volumes of the resonators in order to enhance the performance of the internal combustion engine. However, simply increasing the size of the air cleaner case may possibly increase the size of the straddled vehicle.

It is an object of the present invention, which has been made in order to solve the problem, to provide a straddled vehicle with which it is possible to ensure a sufficient volume of the air cleaner case on the downstream side relative to the air-cleaning element while suppressing an increase in size and reducing noise.

Solution to Problem

A straddled vehicle according to the present invention includes an air cleaner and a resonator. The air cleaner includes an air cleaner case, an air-cleaning element arranged inside the air cleaner case, and a duct that is attached to the air-cleaning element and at least a portion of which is arranged inside the air cleaner case, wherein the duct guides the air toward the air-cleaning element. The resonator has an outer wall arranged around the duct. The duct and the outer wall together define at least a portion of a resonance chamber of the resonator.

With the straddled vehicle described above, it is possible to reduce the noise by means of the resonator. The resonator is arranged by making use of the dead space around the duct. The duct itself is used as a member that forms a portion of the resonance chamber of the resonator. Therefore, it is possible to arrange the resonator without increasing the size of the air cleaner case. The resonator is arranged on the upstream side relative to the air-cleaning element. Thus, it is possible to ensure a sufficient volume of the air cleaner case on the downstream side relative to the air-cleaning element.

According to one preferred embodiment, a portion of the outer wall is arranged inside the air cleaner case, and another portion of the outer wall is arranged outside the air cleaner case.

According to the embodiment described above, a portion of the resonator is arranged outside the air cleaner case. Since it is possible to reduce the volume of the resonator arranged inside the air cleaner case, it is possible to suppress an increase in the size of the air cleaner case.

According to one preferred embodiment, the air-cleaning element is attached to the air cleaner case. The outer wall is attached to the air-cleaning element and not attached to the air cleaner case.

According to the embodiment described above, the air-cleaning element, the duct and the outer wall are attachable, as an integral part, to the air cleaner case. Thus, the attachment of the air-cleaning element and the resonator is made easy.

According to one preferred embodiment, the resonance chamber of the resonator includes a first resonance chamber, and a second resonance chamber partitioned from the first resonance chamber.

The frequency of the noise that is reduced by the resonator depends on the volume of the resonance chamber. When the volume of the resonance chamber is large, there may be a frequency domain where the noise-reducing effect is lowered, due to anti-resonance. According to the embodiment described above, since the resonance chamber of the resonator is divided into at least two resonance chambers, it is possible to suppress the volume per resonance chamber. Therefore, it is possible to suppress anti-resonance.

According to one preferred embodiment, a volume of the first resonance chamber is different from a volume of the second resonance chamber.

According to the embodiment described above, two resonance chambers of different frequency characteristics are used in combination with each other. This increases the range of frequency over which the noise is suppressed.

According to one preferred embodiment, the outer wall is inclined relative to a center line of the duct so as to move away from the center line of the duct while extending toward the air-cleaning element.

According to the embodiment described above, the resonator is arranged in a compact arrangement. The resonator is able to be arranged close to the duct, and it is possible to effectively suppress noise.

According to one preferred embodiment, the air cleaner case has an opening into which the duct and the outer wall are inserted. On a cross section including the center line of the duct, a peripheral portion of the opening of the air cleaner case is inclined relative to the center line of the duct so as to move away from the center line of the duct while extending toward the air-cleaning element.

According to the embodiment described above, the air cleaner case is shaped so as to extend along the outer wall of the resonator. Therefore, it is possible to reduce the size of a portion of the air cleaner case in the vicinity of the resonator.

According to one preferred embodiment, the duct includes an inlet opening and an outlet opening opposing the air-cleaning element. The resonator includes a bottom wall extending from the outlet opening of the duct radially outward of the outlet opening. The outer wall and the bottom wall are connected to each other. The duct, the outer wall and the bottom wall together define the resonance chamber of the resonator.

According to the embodiment described above, the resonator is formed with a simple configuration.

According to one preferred embodiment, the bottom wall is spaced apart from the air-cleaning element and is arranged parallel to the air-cleaning element.

According to the embodiment described above, the flow of the air having passed through the duct flares before the air-cleaning element. Therefore, it is possible to supply the air to a greater area of the air-cleaning element.

According to one preferred embodiment, the resonator includes a tubular portion having a first opening that is facing toward an outside of the air cleaner case, and a second opening that is facing toward the resonance chamber.

According to the embodiment described above, the resonance frequency of the resonator is easily changed by changing the length or the passage cross-sectional area of the tubular portion. This makes it easy to adjust the resonance frequency of the resonator.

According to one preferred embodiment, the tubular portion is arranged outside the air cleaner case.

According to the embodiment described above, it is possible to ensure a larger volume of the air cleaner case as compared with a case where the tubular portion is arranged inside the air cleaner case.

According to one preferred embodiment, a center line of the duct and a center line of the tubular portion are parallel to each other.

According to the embodiment described above, the tubular portion is unlikely to interfere with the air passing through the duct. This smoothes the flow of the air through the duct.

According to one preferred embodiment, a length of the duct in a direction along the center line is shorter than an outer diameter of the duct.

According to the embodiment described above, since the length of the duct is relatively short, the air resistance of the duct is small. This smoothes the flow of the air through the duct.

According to one preferred embodiment, the duct is formed straight.

According to the embodiment described above, the air resistance of the duct is small as compared with a case where the duct is bent or curved. This smoothes the flow of the air through the duct.

Advantageous Effects of Invention

According to the present invention, it is possible to provide a straddled vehicle with which it is possible to ensure a sufficient volume of the air cleaner case on the downstream side relative to the air-cleaning element while suppressing an increase in size and reducing noise.

DESCRIPTION OF EMBODIMENTS

Figure 1:
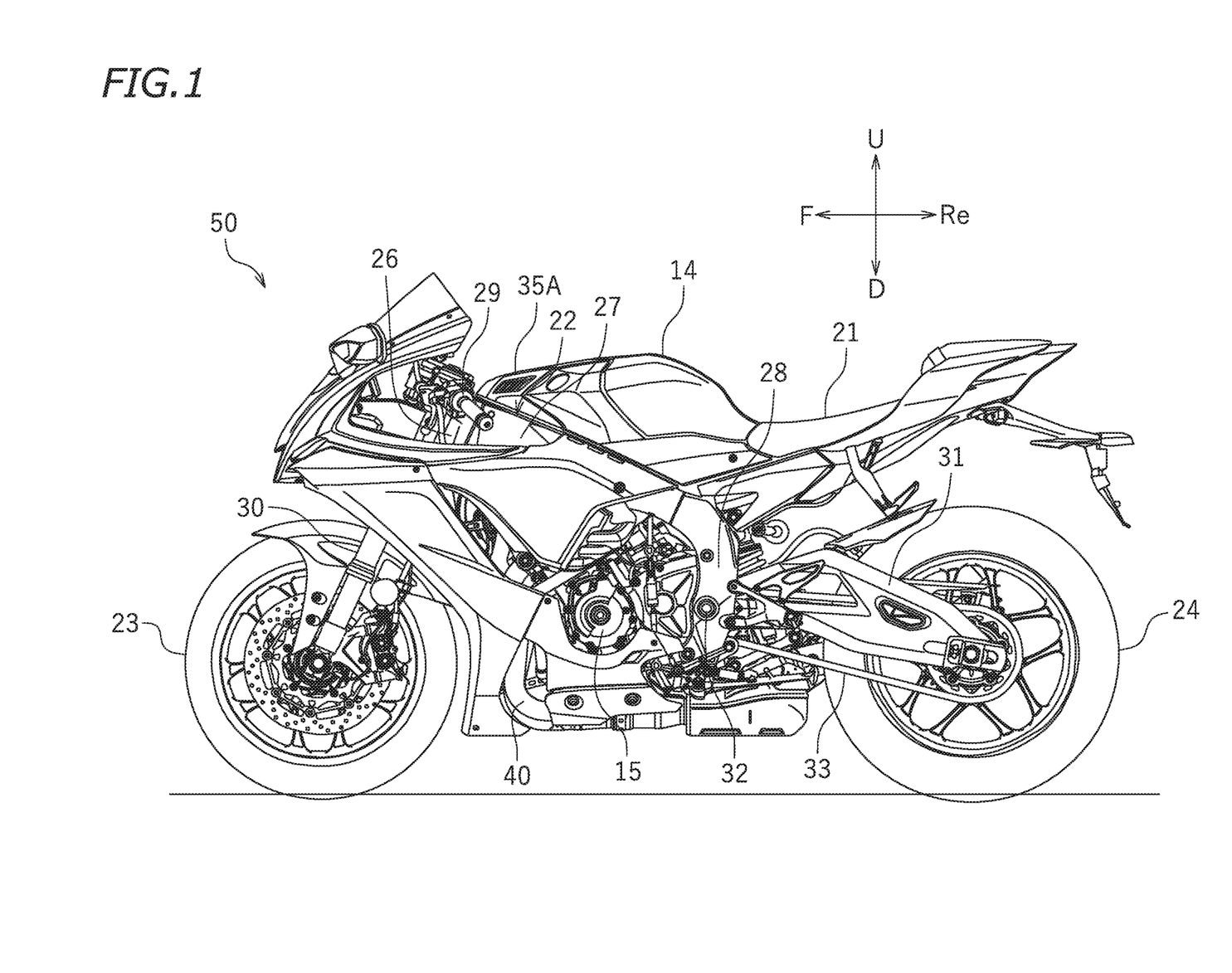
FIG. 1 is a left side view of a motorcycle according to an embodiment.

An embodiment of the present invention will now be described with reference to the drawings. FIG. 1 is a left side view of a motorcycle 50 according to the present embodiment.

The terms front, rear, left, right, up and down, as used in the description below, refer to these directions as seen from a virtual rider seated on a seat 21 while the motorcycle 50 is standing upright on a horizontal surface with no rider, no fuel and no load thereon, unless specified otherwise. The designations F, Re, L, R, U and D, as used in the figures, refer to front, rear, left, right, up and down, respectively. Unless specified otherwise, the term "front/forward" refers not only to the direction that extends in the front direction along the vehicle center line, as the vehicle is seen from above, but also to directions that are inclined left/right from that direction by an angle that is less than or equal to 45 degrees. Similarly, the term "rear/rearward" refers not only to the direction that extends rearward along the vehicle center line, as the vehicle is seen from above, but also to directions that are inclined left/right from that direction by an angle of 45 degrees of less. The term "left/leftward" refers not only to the direction that extends leftward vertical to the vehicle center line, as the vehicle is seen from above, but also to directions that are inclined frontward/rearward from that direction by an angle of 45 degrees of less. The term "right/rightward" refers not only to the direction that extends rightward vertical to the vehicle center line, as the vehicle is seen from above, but also to directions that are inclined frontward/rearward from that direction by an angle of 45 degrees of less. The term "up/upward" refers not only to the vertically upward direction, as the vehicle is seen from sideways, but also to directions that are inclined frontward/rearward from that direction by an angle of 45 degrees of less. The term "down/downward" refers not only to the vertically downward direction, as the vehicle is seen from sideways, but also to directions that are inclined frontward/rearward from that direction by an angle of 45 degrees of less.

As shown in FIG. 1, the motorcycle 50 includes a vehicle frame 22, a front wheel 23, a rear wheel 24, an internal combustion engine (hereinafter "engine") 15, an air cleaner 35 covered by an external cover 35A (see FIG. 2), a fuel tank 14, and the seat 21. At least a portion of the air cleaner 35 is arranged forward of the fuel tank 14. The seat 21 is arranged rearward of the fuel tank 14.

The vehicle frame 22 includes a head pipe 26, left and right side frames 27 extending rearward and outward in the vehicle width direction from the head pipe 26, and left and right down frames 28 extending downward from the rear end of the left and right side frames 27, respectively. A steering shaft (not shown), to which a handle 29 is secured, is supported on the head pipe 26 so that the steering shaft can pivot left and right. The steering shaft is secured to a front fork 30.

The front wheel 23 is supported on the front fork 30. The rear wheel 24 is supported on a rear end portion of a rear arm 31. The front end portion of the rear arm 31 is supported by a pivot shaft 32 so that the rear arm 31 can pivot up and down relative to the down frame 28. The front wheel 23 is a driven wheel. The rear wheel 24 is a driving wheel that is driven by the engine 15. The engine 15 and the rear wheel 24 are linked by a chain 33. The chain 33 is an example of a power transmission member. Note however that the power transmission member that transmits the power of the engine 15 to the rear wheel 24 is not limited to the chain 33, but it may be a transmission belt, a drive shaft, etc.

Figure 2:
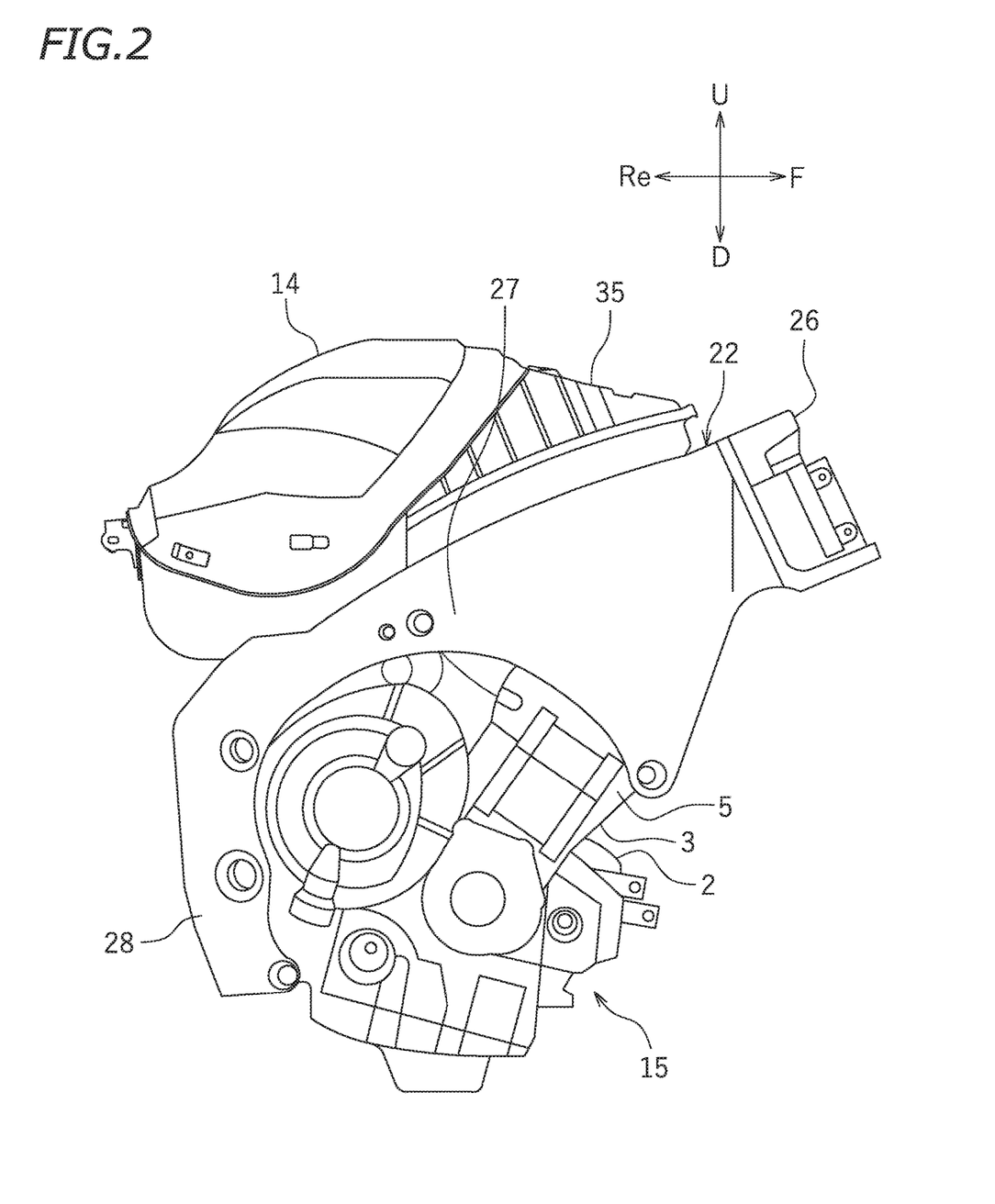
FIG. 2 is a right side view of a portion of a vehicle frame, an internal combustion engine, an air cleaner and a fuel tank.
Figure 3:
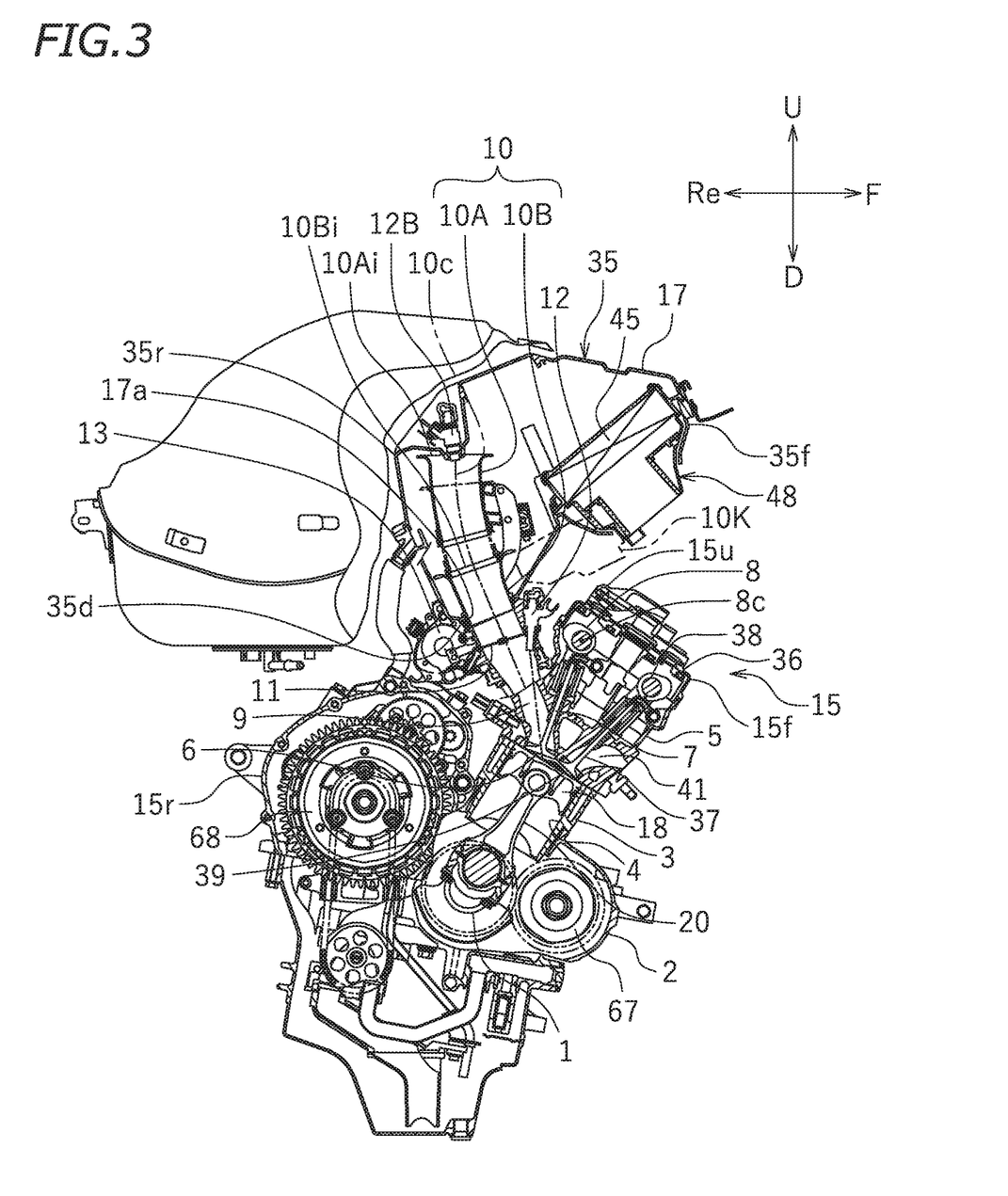
FIG. 3 is a cross-sectional view of an internal combustion engine and an air cleaner as seen from the right side.

FIG. 2 is a right side view of a portion of the vehicle frame 22, the engine 15, the air cleaner 35 and the fuel tank 14. FIG. 3 is a cross-sectional view of the engine 15 and the air cleaner 35 as seen from the right side.

As shown in FIG. 2, the engine 15 is supported on the vehicle frame 22. As shown in FIG. 3, the engine 15 includes a crankshaft 1, a crankcase 2, a cylinder body 3, a cylinder head 5, and a cylinder head cover 36. The engine 15 includes an intake valve 7, an exhaust valve 37, an intake cam 8, an exhaust cam 38, an intake pipe 10, an exhaust pipe 40 (see FIG. 1), a fuel injector 12, a fuel injector 12B, a throttle valve 11, and a motor 13 for actuating the throttle valve 11.

The crankshaft 1 extends in the vehicle width direction. The crankshaft 1 is arranged inside the crankcase 2. The crankcase 2 rotatably supports the crankshaft 1. The cylinder body 3 extends forward and upward from the crankcase 2. A cylinder 4 is formed inside the cylinder body 3. A piston 18 is arranged inside the cylinder 4. A connecting rod 20 is linked to the piston 18 and the crankshaft 1. The piston 18 is linked to the crankshaft 1 via the connecting rod 20. Note that reference sign 67 denotes a balancer gear, and reference sign 68 denotes a clutch.

The cylinder head 5 is connected to the cylinder body 3. The cylinder head 5 extends forward and upward from the cylinder body 3. The cylinder head cover 36 is connected to the cylinder head 5. The cylinder head cover 36 extends forward and upward from the cylinder head 5. An intake opening 6 and an exhaust opening 39 are formed inside the cylinder head 5 with their openings facing toward the inside of the cylinder 4. An intake port 9 connected to the intake opening 6 and an exhaust port 41 connected to the exhaust opening 39 are formed inside the cylinder head 5. The intake valve 7 and the exhaust valve 37 are supported on the cylinder head 5. The intake valve 7 covers the intake opening 6 so that it can open/close the intake opening 6, and the exhaust valve 37 covers the exhaust opening 39 so that it can open/close the exhaust opening 39.

The intake cam 8 and the exhaust cam 38 are rotatably supported on the cylinder head 5. The intake cam 8 rotates to thereby open/close the intake valve 7. The exhaust cam 38 rotates to thereby open/close the exhaust valve 37.

The intake pipe 10 is connected to the cylinder head 5 and is connected to the intake port 9. The intake pipe 10 is configured to guide the air to the intake port 9. The intake pipe 10 extends upward from the cylinder head 5. Specifically, the intake pipe 10 extends upward and rearward from the cylinder head 5.

The intake pipe 10 includes a first intake pipe 10A and a second intake pipe 10B. The first intake pipe 10A is arranged upward of the second intake pipe 10B. The first intake pipe 10A is arranged on the upstream side relative to the second intake pipe 10B. The first intake pipe 10A is attachable to and detachable from the second intake pipe 10B. The motorcycle 50 includes an actuator 10K that actuates the first intake pipe 10A.

As the actuator 10K moves the first intake pipe 10A downward, the first intake pipe 10A is connected to the second intake pipe 10B. Then, the air is sucked in through an inlet 10Ai of the first intake pipe 10A, passes through the first intake pipe 10A and the second intake pipe 10B, and then flows into the intake port 9. As the actuator 10K moves the first intake pipe 10A upward, the first intake pipe 10A moves apart from the second intake pipe 10B. Then, the air is sucked in through an inlet 10Bi of the second intake pipe 10B, passes through the second intake pipe 10B, and is then sucked into the intake port 9.

As the first intake pipe 10A is connected to the second intake pipe 10B, the length of the intake pipe 10 becomes the total length of the length of the first intake pipe 10A and the length of the second intake pipe 10B. As the first intake pipe 10A is moves apart from the second intake pipe 10B, the length of the intake pipe 10 becomes equal to the length of the second intake pipe 10B. Thus, by attaching and detaching the first intake pipe 10A to and from the second intake pipe 10B, the length of the intake pipe 10 is varied. Note however that the length of the intake pipe 10 does not always need to be variable. The first intake pipe 10A and the second intake pipe 10B may be always connected to each other. The first intake pipe 10A and the second intake pipe 10B may be integral with each other. The first intake pipe 10A may be omitted.

The throttle valve 11 is arranged inside the intake pipe 10. Specifically, the throttle valve 11 is arranged inside the second intake pipe 10B. The throttle valve 11 is actuated by the motor 13. The motor 13 is linked to the throttle valve 11 so that power is transmitted therebetween. At least a portion of the motor 13 is arranged rearward of the intake pipe 10. Herein, the entirety of the motor 13 is arranged rearward of the intake pipe 10.

The fuel injector 12 is attached to the intake pipe 10. Specifically, the fuel injector 12 is attached to the second intake pipe 10B. The fuel injector 12 is attached so as to extend upward from the intake pipe 10. At least a portion of the fuel injector 12 is arranged forward of the intake pipe 10.

The fuel injector 12B is attached to an air cleaner case 17. The fuel injector 12B is arranged upward of the intake pipe 10. Specifically, the fuel injector 12B is arranged upward of the first intake pipe 10A.

As shown in FIG. 3, the air cleaner 35 is arranged in the vicinity of the engine 15. A portion of the air cleaner 35 is at the same location, for the up-down direction, as a portion of the engine 15. A portion of the air cleaner 35 is at the same position, for the front-rear direction, as a portion of the engine 15. A lower end 35d of the air cleaner 35 is located downward relative to an upper end 15u of the engine 15. A front end 35f of the air cleaner 35 is located forward relative to a rear end 15r of the engine 15, and a rear end 35r of the air cleaner 35 is located rearward relative to a front end 15f of the engine 15.

Figure 4:
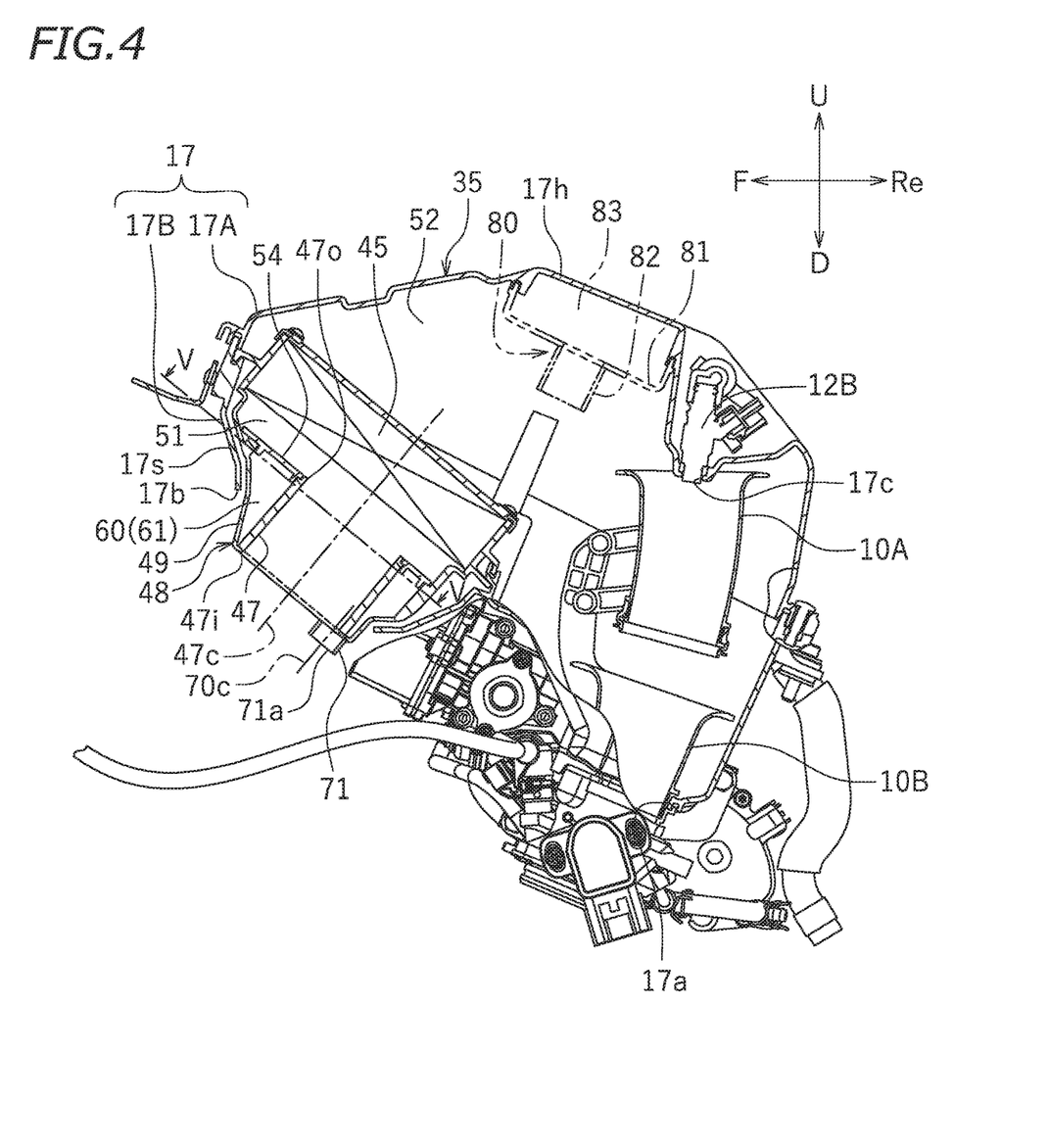
FIG. 4 is a cross-sectional view of an air cleaner as seen from the left side.

FIG. 4 is a cross-sectional view of the air cleaner 35 as seen from the left side. As shown in FIG. 4, the air cleaner 35 includes the air cleaner case 17, the air-cleaning element 45 and a duct 47.

The air cleaner case 17 has an opening 17b and a connection port 17a to which the intake pipe 10 is connected (see FIG. 3). The air cleaner case 17 has an attachment port 17c to which the fuel injector 12B is attached. Although there is no particular limitation on the direction of the opening 17b, the opening 17b is facing forward and downward in the present embodiment. The air cleaner case 17 includes an upper case 17A and a lower case 17B. The air cleaner case 17 is formed by assembling the upper case 17A and the lower case 17B together. The attachment port 17c is formed in the upper case 17A, and the opening 17b and the connection port 17a are formed in the lower case 17B. However, the present invention is not limited to this example embodiment. For example, the opening 17b may be formed in the upper case 17A, the air cleaner case 17 may be composed of three or more components, or other modification may be made within the scope of the present invention.

The air-cleaning element 45 is arranged inside the air cleaner case 17. The air-cleaning element 45 may be, for example, an air filter. The inside of the air cleaner case 17 is partitioned by the air-cleaning element 45 into a pre-cleaning chamber 51 and a post-cleaning chamber 52. The pre-cleaning chamber 51 is located on the upstream side relative to the air-cleaning element 45, and the post-cleaning chamber 52 is located on the downstream side relative to the air-cleaning element 45. Note that the upstream side refers to the side from which the air flows, and the downstream side refers to the side to which the air flows. The air before being cleaned by the air-cleaning element 45 flows into the pre-cleaning chamber 51. The air after being cleaned by the air-cleaning element 45 flows into the post-cleaning chamber 52. A clean air is stored in the post-cleaning chamber 52.

The duct 47 is configured to guide the air toward the air-cleaning element 45. The duct 47 is attached to the air-cleaning element 45 with an outer wall 49 to be described below interposed therebetween. At least a portion of the duct 47 is arranged inside the air cleaner case 17. Herein, a portion of the duct 47 is arranged inside the air cleaner case 17, and the other portion thereof is arranged outside the air cleaner case 17. The duct 47 includes an inlet opening 47i, and an outlet opening 47o opposing the air-cleaning element 45. While the duct 47 may be bent or curved, the duct 47 is formed to extend along a straight line (the duct has a straight center axis) in the present embodiment.

Figure 6:
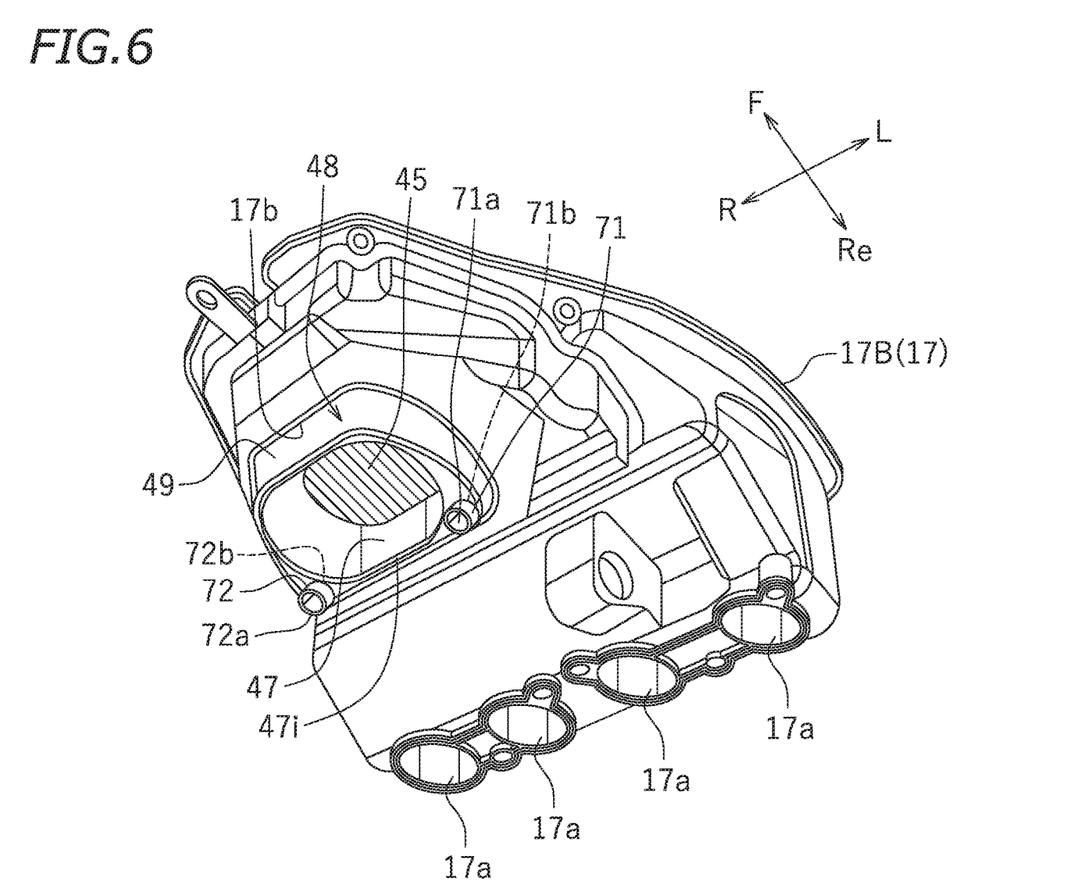
FIG. 6 is a perspective view of a lower case, an air-cleaning element and a resonator of an air cleaner case.

The cross section of the duct 47 may have a circular shape, or any other shape such as an elliptical shape, a square shape, a rectangular shape or a pentagonal shape. Herein, as shown in FIG. 6, the duct 47 is formed in an oblong circular shape of which the dimension in the left-right direction is greater than the dimension in the front-rear direction. As shown in FIG. 4, the length of the duct 47 in the direction along the center line 47c is shorter than the outer diameter of the duct 47. Note that where the cross section of the duct 47 does not have a circular shape, the outer diameter of the duct 47 refers to the hydraulic diameter.

A bottom wall 54 extending radially outward from the outlet opening 47o is attached to the duct 47. While the bottom wall 54 may be inclined relative to the duct 47, it is herein arranged perpendicular to the duct 47. The bottom wall 54 is spaced apart from the air-cleaning element 45 and is arranged parallel to the air-cleaning element 45.

In the present embodiment, a resonator 48 is formed using the duct 47. The resonator 48 includes the outer wall 49 arranged around the duct 47, and the duct 47 and the outer wall 49 together define at least a portion of a resonance chamber 60 of the resonator 48. Herein, the duct 47, the outer wall 49 and the bottom wall 54 together define the resonance chamber 60 of the resonator 48. A portion of the outer wall 49 is arranged inside the air cleaner case 17, and the other portion thereof is arranged outside the air cleaner case 17. The outer wall 49 is integral with the duct 47. The outer wall 49 and the duct 47 are formed of a single component.

The outer wall 49 is attached to the air-cleaning element 45 and not attached to the air cleaner case 17. Note that not attached to the air cleaner case 17 herein means that it is not attached directly to the air cleaner case 17. The outer wall 49 is attached indirectly to the air cleaner case 17 with the air-cleaning element 45 interposed therebetween. The outer wall 49 is formed non-parallel to the duct 47. The outer wall 49 is inclined relative to the center line 47c of the duct 47 so as to move away from the center line 47c of the duct 47 while extending toward the air-cleaning element 45. The width of the resonator 48 decreases while extending away from the air-cleaning element 45.

The duct 47 and the outer wall 49 are inserted into the opening 17b of the air cleaner case 17. As shown in FIG. 4, a peripheral portion 17s of the opening 17b of the air cleaner case 17 is shaped so as to extend along the outer wall 49. On the cross section including the center line 47c of the duct 47, the peripheral portion 17s of the opening 17b of the air cleaner case 17 is inclined relative to the center line 47c of the duct 47 so as to move away from the center line 47c of the duct 47 while extending toward the air-cleaning element 45.

Figure 5:
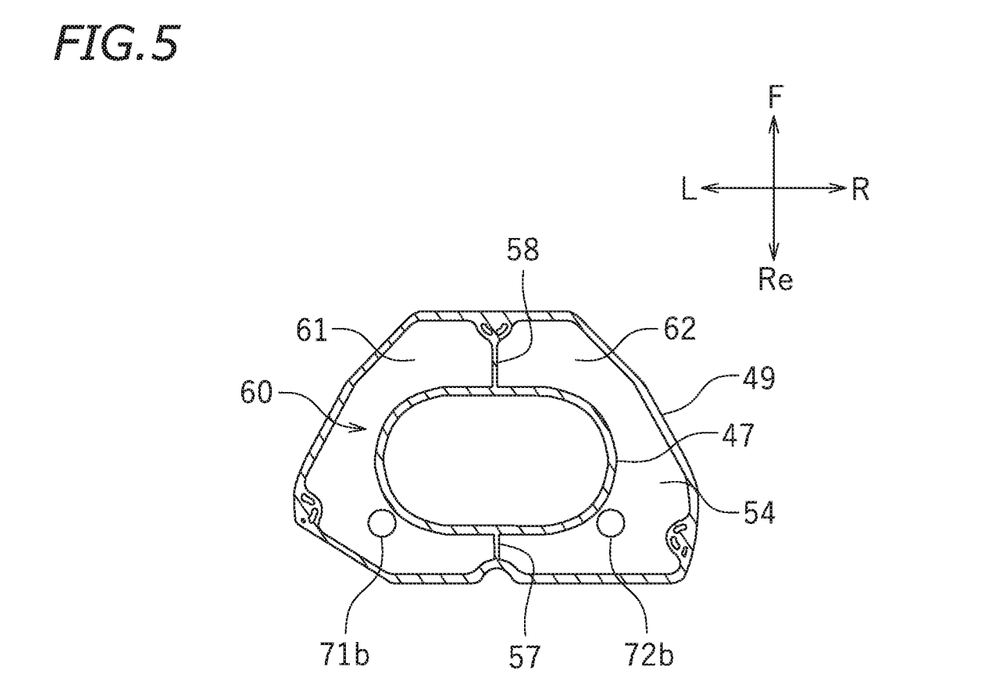
FIG. 5 is a cross-sectional view taken along line V-V of FIG. 4.

While there may be a single resonance chamber 60 of the resonator 48, the inside of the resonator 48 is herein divided by partition walls 57 and 58 into a first resonance chamber 61 and a second resonance chamber 62, as shown in FIG. 5. The second resonance chamber 62 is arranged rightward of the first resonance chamber 61. The resonator 48 includes two resonance chambers 61 and 62. The first resonance chamber 61 is formed in a C-letter shape, and the second resonance chamber 62 is formed in an inverted C-letter shape. While the volume of the first resonance chamber 61 and the volume of the second resonance chamber 62 may be equal to each other, they are herein different from each other.

As shown in FIG. 6, the resonator 48 includes a first tubular portion 71 connected to the first resonance chamber 61, and a second tubular portion 72 connected to the second resonance chamber 62. The first tubular portion 71 and the second tubular portion 72 are arranged outside the air cleaner case 17. While the first tubular portion 71 and the second tubular portion 72 may be bent or curved, they are herein formed straight. The center line 70c of the first tubular portion 71 (see FIG. 4) is parallel to the center line 47c of the duct 47. The center line of the second tubular portion 72 is also parallel to the center line 47c of the duct 47. The first tubular portion 71 includes a first opening 71a that is facing toward the outside of the air cleaner case 17, and a second opening 71b that is facing toward the first resonance chamber 61. The second tubular portion 72 includes a first opening 72a that is facing toward the outside of the air cleaner case 17, and a second opening 72b that is facing toward the second resonance chamber 62. The first resonance chamber 61 communicates with the outside through the first tubular portion 71, and the second resonance chamber 62 communicates with the outside through the second tubular portion 72. The first openings 71a and 72a are facing forward and downward. Note however that there is no limitation on the configuration.

The motorcycle 50 is configured as described above. Next, various effects of the motorcycle 50 according to the present embodiment will be described.

Since the motorcycle 50 according to the present embodiment includes the resonator 48, it is possible to reduce the noise from the engine 15 by means of the resonator 48. In the present embodiment, the resonator 48 is arranged by making use of the dead space around the duct 47 of the air cleaner 35. Moreover, the duct 47 itself is used as a member that forms a portion of the resonator 48. Therefore, it is possible to arrange the resonator 48 without increasing the size of the air cleaner case 17. Since there is no need to increase the size of the air cleaner case 17, it is possible to suppress an increase in the size of the motorcycle 50. The resonator 48 is arranged on the upstream side relative to the air-cleaning element 45. There is no need to provide a space for installing the resonator 48 on downstream side relative to the air-cleaning element 45 in the air cleaner case 17. There is no need to provide a space for installing the resonator 48 in the post-cleaning chamber 52 of the air cleaner 35. Thus, it is possible to ensure a sufficient volume of the post-cleaning chamber 52. Therefore, it is possible to quickly supply a sufficient amount of clean air to the engine 15, and it is possible to improve the performance of the engine 15.

According to the present embodiment, a portion of the outer wall 49 that forms a portion of the resonator 48 is arranged outside the air cleaner case 17. Since it is possible to reduce the volume of the resonator 48 arranged inside the air cleaner case 17, it is possible to suppress an increase in the size of the air cleaner case 17.

According to the present embodiment, the resonator 48 is composed of the duct 47, the outer wall 49 and the bottom wall 54. The resonator 48 is formed with a simple configuration.

The duct 47 is integral with the outer wall 49, and the bottom wall 54 is attached to the outer wall 49 and the duct 47. While the outer wall 49 is attached to the air-cleaning element 45, it is not attached directly to the air cleaner case 17. According to the present embodiment, the air-cleaning element 45, the duct 47 and the outer wall 49 are attached, as an integral part, to the air cleaner case 17. The resonator 48 is assembled to the air-cleaning element 45, and is not attached directly to the air cleaner case 17. According to the present embodiment, there is no need to separately attach the air-cleaning element 45 and the resonator 48 to the air cleaner case 17. The resonator 48 is installed simply by attaching the air-cleaning element 45 to the air cleaner case 17. Thus, the attachment of the air-cleaning element 45 and the resonator 48 is made easy.

According to the present embodiment, the resonance chamber 60 of the resonator 48 includes the first resonance chamber 61, and the second resonance chamber 62 partitioned from the first resonance chamber 61. The frequency of the noise that is reduced by the resonator 48 depends on the volume of the resonance chamber of the resonator 48. When the frequency of the noise of the engine 15 is spread over a wide range, it can be addressed by increasing the volume without dividing the resonance chamber 60 in two. When the volume is increased, however, there may be a frequency domain where the noise-reducing effect is lowered, due to anti-resonance. According to the present embodiment, since the resonance chamber 60 of the resonator 48 is divided into the first resonance chamber 61 and the second resonance chamber 62, it is possible to suppress anti-resonance.

While the volume of the first resonance chamber 61 and the volume of the second resonance chamber 62 may be equal to each other, they may be different from each other in the present embodiment. Then, it is possible to provide two resonators of different frequency characteristics. This increases the range of frequency over which the noise is suppressed.

According to the present embodiment, the outer wall 49 of the resonator 48 is inclined relative to the center line 47c of the duct 47 so as to move away from the center line 47c of the duct 47 while extending toward the air-cleaning element 45. According to the present embodiment, the resonator 48 is arranged in a compact arrangement. Moreover, the resonator 48 is arranged close to the duct 47, and it is possible to effectively suppress noise.

According to the present embodiment, the peripheral portion 17s of the opening 17b of the air cleaner case 17 is shaped so as to extend along the outer wall 49 of the resonator 48. Therefore, it is possible to reduce the size of a portion of the air cleaner case 17 in the vicinity of the resonator 48.

According to the present embodiment, the bottom wall 54 of the resonator 48 is spaced apart from the air-cleaning element 45 and is arranged parallel to the air-cleaning element 45. Thus, the flow of the air having passed through the duct 47 flares before the air-cleaning element 45. Therefore, it is possible to supply the air to a greater area of the air-cleaning element 45. Thus, it is possible to ensure a sufficient cleaning capacity of the air cleaner 35.

According to the present embodiment, the resonator 48 includes the first tubular portion 71 and the second tubular portion 72. The resonance frequency of the resonator 48 is easily changed by changing the length or the passage cross-sectional area of the first tubular portion 71 and the second tubular portion 72. Therefore, it is possible to adjust the resonance frequency of the resonator 48. It is possible to effectively suppress noise by matching the resonance frequency of the resonator 48 with the frequency of the noise of the engine 15.

According to the present embodiment, the first tubular portion 71 and the second tubular portion 72 are arranged outside the air cleaner case 17. It is possible to ensure a larger volume of the air cleaner case 17 as compared with a case where the first tubular portion 71 and the second tubular portion 72 are arranged inside the air cleaner case 17.

According to the present embodiment, the center line 70c of the first tubular portion 71 and the second tubular portion 72 is parallel to the center line 47c of the duct 47. The first tubular portion 71 and the second tubular portion 72 are unlikely to interfere with the air passing through the duct 47. This smoothes the flow of the air through the duct 47.

According to the present embodiment, the length of the duct 47 in the direction along the center line 47c is shorter than the outer diameter of the duct 47. Since the length of the duct 47 is relatively short, the air resistance of the duct 47 is small. This smoothes the flow of the air through the duct 47.

According to the present embodiment, the duct 47 is formed straight. The air resistance of the duct 47 is small as compared with a case where the duct 47 is bent or curved. This smoothes the flow of the air through the duct 47.

While one embodiment has been described above, the embodiment is merely illustrative. Various other embodiments are possible.

While no resonator is provided in the post-cleaning chamber 52 of the air cleaner 35 in the embodiment described above (see FIG. 3), according to another embodiment, a resonator 80 may be provided in the post-cleaning chamber 52 as indicated by a phantom line in FIG. 4. For example, a resonance chamber 83 may be defined by a portion 17*h* of the air cleaner case 17 and a case 81, and the resonator 80 may be formed by connecting a tubular portion 82 to the case 81. Then, it is possible to further reduce the noise of the engine 15.

Since there is ensured a sufficient volume of the post-cleaning chamber 52 of the air cleaner 35, the air cleaner 35 will not be too large even if an additional resonator 80 is arranged inside the post-cleaning chamber 52. If the volume of the first resonance chamber 61, the volume of the second resonance chamber 62 and the volume of the resonance chamber 83 are different from each other, it is possible to reduce noise over an even wider range of frequency. With a straddled vehicle like the motorcycle 50, as compared with an automobile, there tends to be more variations of the rotation speed of the engine 15. With the provision of three resonance chambers 61, 62 and 83 of different volumes, it is possible to reduce noise for a wide range of engine rotation speeds.

While a portion of the resonator 48 is arranged outside the air cleaner case 17 in the embodiment described above, embodiments of the invention are not limited only to this configuration. For example, in one embodiment, the entirety of the resonator 48 may be arranged inside the air cleaner case 17.

While the resonator 48 is attached to the air-cleaning element 45 and not attached directly to the air cleaner case 17 in the embodiment described above, embodiments of the invention are not limited to this configuration. According to one embodiment, the resonator 48 may be attached directly to the air cleaner case 17.

While the outer wall 49 of the resonator 48 is inclined relative to the center line 47*c* of the duct 47 in the embodiment described above, embodiments of the invention are not limited to this configuration. According to one embodiment, the outer wall 49 may be parallel to the center line 47*c* of the duct 47.

While the bottom wall 54 of the resonator 48 is perpendicular to the center line 47*c* of the duct 47 and is arranged parallel to the air-cleaning element 45 in the embodiment described above, embodiments of the invention are not limited to this configuration. According to one embodiment, the bottom wall 54 may be inclined relative to the center line 47*c* of the duct 47 so as to extend radially outward of the duct 47 while extending toward the air-cleaning element 45. Then, it is possible to more smoothly supply the air from the duct 47 toward the air-cleaning element 45.

While the length of the duct 47 in the direction along the center line 47*c* is shorter than the outer diameter of the duct 47 in the embodiment described above, there is no particular limitation thereto.

The engine 15 may be a multi-cylinder internal combustion engine including a plurality of cylinders 4 or may be a single-cylinder internal combustion engine including only one cylinder 4. The internal combustion engine may be a water-cooled internal combustion engine or may be an air-cooled internal combustion engine.

A straddled vehicle refers to a vehicle that is straddled by a passenger. While a motorcycle is an example of a straddled vehicle, a straddled vehicle is not limited to a motorcycle. A straddled vehicle may include an auto tricycle, an ATV (All Terrain Vehicle), and the like, as well as a motorcycle.

The terms and expressions used herein are used for explanation purposes and should not be construed as being restrictive. It should be appreciated that the terms and expressions used herein do not eliminate any equivalents of features illustrated and mentioned herein, but include various modifications falling within the claimed scope of the present invention. The present invention may be embodied in many different forms. The present disclosure is to be considered as providing examples of the principles of the invention. These examples are described herein with the understanding that such examples are not intended to limit the present invention to preferred embodiments described herein and/or illustrated herein. Hence, the present invention is not limited to the preferred embodiments described herein. The present invention includes any and all preferred embodiments including equivalent elements, modifications, omissions, combinations, adaptations and/or alterations as would be appreciated by those skilled in the art on the basis of the present disclosure. The limitations in the claims are to be interpreted broadly based on the language included in the claims and not limited to examples described in the present specification or during the prosecution of the application.

REFERENCE SIGNS LIST

17 Air cleaner case
35 Air cleaner
45 Air-Cleaning Element
47 Duct
48 Resonator
49 Outer wall
50 Motorcycle (straddled vehicle)
54 Bottom wall
60 Resonance chamber
61 First resonance chamber
62 Second resonance chamber
71 First tubular portion
71*a* First opening
71*b* Second opening
72 Second tubular portion
72*a* First opening
72*b* Second opening

The invention claimed is:

1. A straddled vehicle comprising:
   an air cleaner including
      an air cleaner case having an opening,
      an air-cleaning element arranged inside the air cleaner case, and
      a duct that is attached to the air-cleaning element through the opening of the air cleaner case, wherein
      the duct has an inner wall and an outer wall surrounding the inner wall,
      at least a portion of the duct, including each of a portion of the inner wall and a portion of the outer wall, is arranged inside the air cleaner case through the opening thereof,
      the inner wall of the duct forms an air duct that guides air toward the air-cleaning element, in a direction from an inlet opening of the air duct to an outlet opening of the air duct
      the outer wall joins the inner wall at the inlet opening of the air duct, and is inclined relative to a center line of the air duct, so as to gradually slope away from the inlet opening of the air duct while extending from the inlet opening of the air duct into the opening of the air cleaner case, and
      a space between the inner and outer walls of the duct forms a resonance chamber of a resonator.

2. The straddled vehicle according to claim 1, wherein another portion of the outer wall is arranged outside the air cleaner case.

3. The straddled vehicle according to claim 1, wherein:
the air-cleaning element is attached to the air cleaner case; and
the outer wall is attached to the air-cleaning element and not directly attached to the air cleaner case.

4. The straddled vehicle according to claim 1, wherein the resonance chamber of the resonator includes a first resonance chamber and a second resonance chamber partitioned from the first resonance chamber.

5. The straddled vehicle according to claim 4, wherein a volume of the first resonance chamber is different from a volume of the second resonance chamber.

6. The straddled vehicle according to claim 1, wherein:
on a cross section including the center line of the air duct, a portion of the air cleaner case peripheral to the opening thereof is inclined relative to the center line of the air duct so as to slope away from the opening of the air cleaner case while extending toward the air-cleaning element.

7. The straddled vehicle according to claim 1, further comprising:
a bottom wall extending from the inner wall of the duct radially outward to connect the outer wall and the inner wall; and
the inner wall, the outer wall and the bottom wall together define the resonance chamber of the resonator.

8. The straddled vehicle according to claim 7, wherein the bottom wall is spaced apart from the air-cleaning element and is arranged parallel to the air-cleaning element.

9. The straddled vehicle according to claim 1, wherein the resonator includes a tubular portion having
a first opening that is facing toward an outside of the air cleaner case, and
a second opening that is facing toward the resonance chamber.

10. The straddled vehicle according to claim 9, wherein the tubular portion is arranged outside the air cleaner case.

11. The straddled vehicle according to claim 9, wherein the center line of the air duct and a center line of the tubular portion are parallel to each other.

12. The straddled vehicle according to claim 1, wherein a length of the duct in a direction along the center line of the air duct is shorter than an outer diameter of the duct.

13. The straddled vehicle according to claim 1, wherein the duct extends along a straight center axis line.

* * * * *